US009640011B2

(12) United States Patent
Dubois et al.

(10) Patent No.: US 9,640,011 B2
(45) Date of Patent: May 2, 2017

(54) MEMORY CARD READER UNIT AND CORRESPONDING TRANSACTIONAL DATA PROCESSING TERMINAL

(71) Applicant: Compagnie Industrielle et Financiere d'Ingenierie "Ingenico", Paris (FR)

(72) Inventors: Eric Dubois, Montvendre (FR); Serge Maisonnat, Mercurol (FR); Richard Allirot, Corenc (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/640,976

(22) Filed: Mar. 6, 2015

(65) Prior Publication Data

US 2015/0254922 A1 Sep. 10, 2015

(30) Foreign Application Priority Data

Mar. 7, 2014 (FR) ..................................... 14 51899

(51) Int. Cl.
*G06K 19/07* (2006.01)
*G07F 7/08* (2006.01)
(Continued)

(52) U.S. Cl.
CPC ............... *G07F 7/088* (2013.01); *G06K 7/01* (2013.01); *G06K 7/084* (2013.01); *G06K 13/0868* (2013.01)

(58) Field of Classification Search
CPC .. G07F 19/2055; G07F 19/211; G07F 7/0886; G07F 7/0893; G07F 7/1008; G07F 19/20; G07F 19/205; G07F 7/0866; G06Q 10/06; G06Q 20/341; G06Q 20/363; G06K 7/0013; G06K 7/006; G06K 7/065; G06K 7/0004; G06K 7/01; G06K 7/082; G06K 7/089; G06K 7/10009; G06K 7/10544;
(Continued)

(56) References Cited

U.S. PATENT DOCUMENTS 5,256,862 A * 10/1993 Watanabe .............. G06Q 40/02
                                                        235/379
6,000,607 A * 12/1999 Ohki .................... G06K 7/0013
                                                        235/379
(Continued)

FOREIGN PATENT DOCUMENTS

EP     1067474 A2    1/2001
EP     1909216 A1    4/2008

OTHER PUBLICATIONS

French Search Report and Written Opinion dated Oct. 29, 2014, for corresponding French Application No. 1451899, filed Mar. 7, 2014.
(Continued)

*Primary Examiner* — Thien T Mai
(74) *Attorney, Agent, or Firm* — David D. Brush; Westman, Champlin & Koehler, P.A.

(57) ABSTRACT

A memory card reader unit, which has a generally rectangular parallelepiped shape. The unit includes a memory card insertion face having an insertion recess and an insertion slot for a memory card, which has a lower lip and an upper lip. The lower lip extends longitudinally and parallel to an insertion plane of a memory card in the reader unit, forming an extended insertion lip extending beyond an insertion plane.

5 Claims, 5 Drawing Sheets

(51) Int. Cl.
*G06K 13/08* (2006.01)
*G06K 7/01* (2006.01)
*G06K 7/08* (2006.01)

(58) Field of Classification Search
CPC ............... G06K 7/10881; G06K 7/087; G06K 19/07722; G06K 19/07747; G06K 13/0831; G06K 13/085; G06K 13/0868; G06K 13/0875; G06K 13/0887; G06K 19/077
See application file for complete search history.

(56) References Cited

U.S. PATENT DOCUMENTS

| | | | | |
|---|---|---|---|---|
| 6,296,182 B1* | 10/2001 | Ota | ............... | G07F 7/02 235/379 |
| 2008/0257965 A1 | 10/2008 | Klein et al. | | |
| 2014/0011381 A1* | 1/2014 | Liang | ............... | G06K 7/0021 439/159 |
| 2014/0372305 A1* | 12/2014 | Ray | ............... | G07F 19/2055 705/44 |

OTHER PUBLICATIONS

English translation of the French Written Opinion dated Oct. 29, 2014, for corresponding French Application No. 1451899, filed Mar. 7, 2014.

\* cited by examiner

MEMORY CARD READER UNIT AND CORRESPONDING TRANSACTIONAL DATA PROCESSING TERMINAL

1. FIELD OF THE DISCLOSURE

The disclosure relates to the field of payment terminals, that allow for a payment by using a memory card (also called a credit card).

More particularly, the disclosure relates to the field of payment terminals with which external monitoring is not necessarily carried out. Such terminals are for example present in car parks, service stations, etc.

These terminals are used when it is not necessary to have an operator in order to make a payment for a good or service.

2. PRIOR ART

Payment terminals face fraud or attempted fraud that is increasingly sophisticated and increasingly ingenious. There are several types of fraud. A first typology makes it possible to distinguish fraud that requires an introduction within the terminal and fraud that does not require an introduction within the terminal.

In the type of fraud that does not require the introduction within the terminal, another typology can be established: fraud with the adding of an additional device onto the terminal (as for example a false façade or a false keyboard) and fraud without the adding of an additional device onto the terminal.

In the framework of a payment terminal that is not subjected to monitoring, fraudsters can have a substantial range of time in order to be able to conduct for example fraud via the adding of an additional device. Indeed, at night, in a service station or in a parking lot the passing of people is reduced and such a fraud can easily be considered.

Until recently, when fraudsters added an additional device onto the terminal, the adding was rather easy to detect. The adding of a false keyboard into the terminal could be detected by a user with a standard level of vigilance, especially when this user was a regular user of the terminal.

Recently a new fraud technique has appeared: fraudsters no longer add a full keyboard but only a device for reading the card data. In order for it to be discreet, this device is placed at the entrance of the insertion slot of the card. Concretely, this fraudulent device has a general rectangular parallelepiped shape. It is fastened at the input of the card reader. When a bank card is inserted into the terminal, this device makes it possible to read the data present on the card. More particularly, this fraudulent device makes it possible to read the data present on the magnetic strip of the card that is inserted into the reader. As such, when the user wants to perform a payment transaction on this terminal, he inserts his card into the reader. When the card is inserted, the fraudulent device records the data of the magnetic strip. The fraudulent device therefore has a magnetic reader head, substantially identical to that of a genuine payment terminal.

This fraudulent module can also comprise a GSM transmission module that makes it possible to transmit, via SMS for example, the data recovered as such.

In order to counter such techniques of fraud, devices exist. These are for example devices for capacitive measurement. These devices are located inside the terminal and can detect the adding of additional hardware onto a face of the terminal. The problem is on the one hand that such a device for capacitive detection is relatively expensive and on the other hand that it is effective in detecting fraudulent devices of a relatively substantial size.

3. SUMMARY

An exemplary embodiment of the disclosure relates to a memory card reader unit of a generally rectangular parallelepiped shape, comprising a memory card insertion face, said insertion face comprising an insertion recess and an insertion slot for a memory card, said insertion slot comprising a lower lip and an upper lip.

According to the technique proposed, said lower lip extends longitudinally and parallel to an insertion plane of a memory card in said Reader unit, forming an extended insertion lip extending beyond an insertion plane.

As such, it is not possible to fasten a fraudulent device on this extended insertion lip without this fastening being immediately perceptible for a use with average attention.

According to a particular embodiment, said extended insertion lip comprises an insertion face, called the front face, substantially flat and parallel to an insertion plane of a memory card in said reader unit.

As such, this lower lip is used as a guide to the zone for reading the data contained in the memory card.

According to a particular embodiment, said extended insertion lip further comprises at least two tabs of a predetermined height.

As such, it is not possible to recess the extended insertion lip without such a recess being immediately visible.

According to a particular characteristic, said at least two tabs form a predetermined angle with an insertion face, referred to as the front face, substantially flat and parallel to an insertion plane of a memory card in said reader unit.

According to a particular characteristic, said at least two tabs are spaced apart by a distance substantially equal to the width of a magnetic strip of a memory card.

Another embodiment relates to a transactional data processing terminal of the type comprising a keyboard for entering personal identification data, a screen for viewing transactional data, a transactional data processing module.

According to a particular characteristic, such a processing terminal comprises a memory card reader unit such as described hereinabove.

4. FIGURES

Other characteristics, purposes and advantages of one or more embodiments of the present disclosure shall appear when reading the following description which shows by way of a non-restricted example, in reference to the annexed drawings; in these drawings.

5. DESCRIPTION

An embodiment of the present disclosure makes it possible to overcome the disadvantages of prior art by modifying the geometry of the insertion slot intended for the bank card. More particularly, the insertion slot is shaped in such a way that it comprises an insertion lip, positioned parallel to the insertion plane of the memory card within the memory card reader.

This insertion lip forms a protuberance in front of the insertion slot. This protuberance makes it possible to prevent the adding of a fraudulent device in front of the insertion slot. In relation with FIG. 1, an isometric view of a memory card Reader unit belonging to a payment terminal and not implementing the technique proposed is shown. This Reader unit (BLe) is of a general rectangular shape. The Reader unit (BLe) comprises a recess (Ev). This recess (Ev) is used to allow two fingers (for example a thumb and an index finger) to insert a bank card (CB) into an insertion slot (FI). This insertion slot comprises a lower lip (LI) and an upper lip (LS). During the use of a terminal which comprises such a Reader unit (BLe), the user places his bank card (CB) between his thumb and his index and introduces this bank card (CB) into the insertion slot (FI) until it abuts in the card reader (i.e. until he can no longer push the bank card).

In most cases, the bank card must be inserted with the embossed face facing upwards (the embossed face is that which comprises the inscription of the name of the holder, the number and the expiration date in relief). The magnetic strip of the card is located under the embossed face. The magnetic strip is positioned according to the standard ISO/IEC 7811 and/or 7816.

Figure 1:
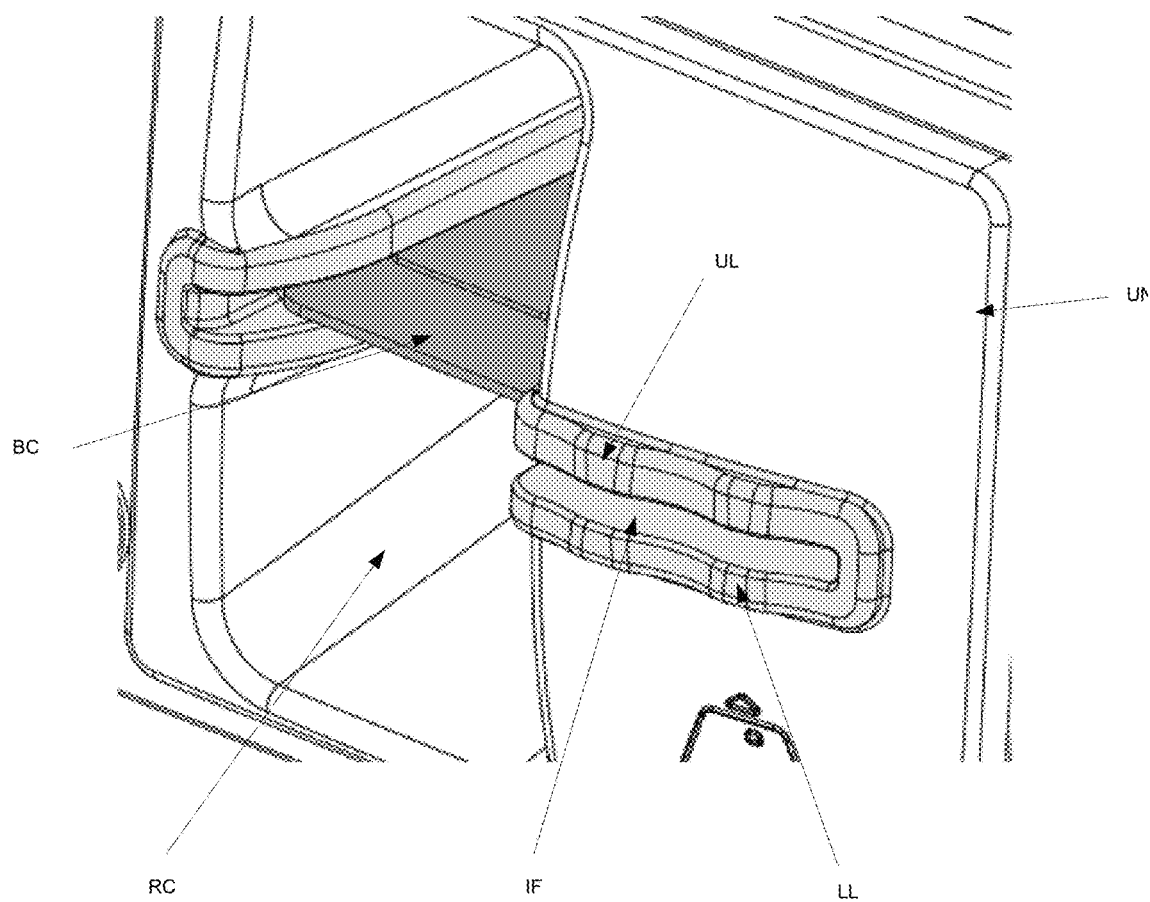
FIG. 1 is a perspective diagrammatical view of a reader unit of prior art.
Figure 2:
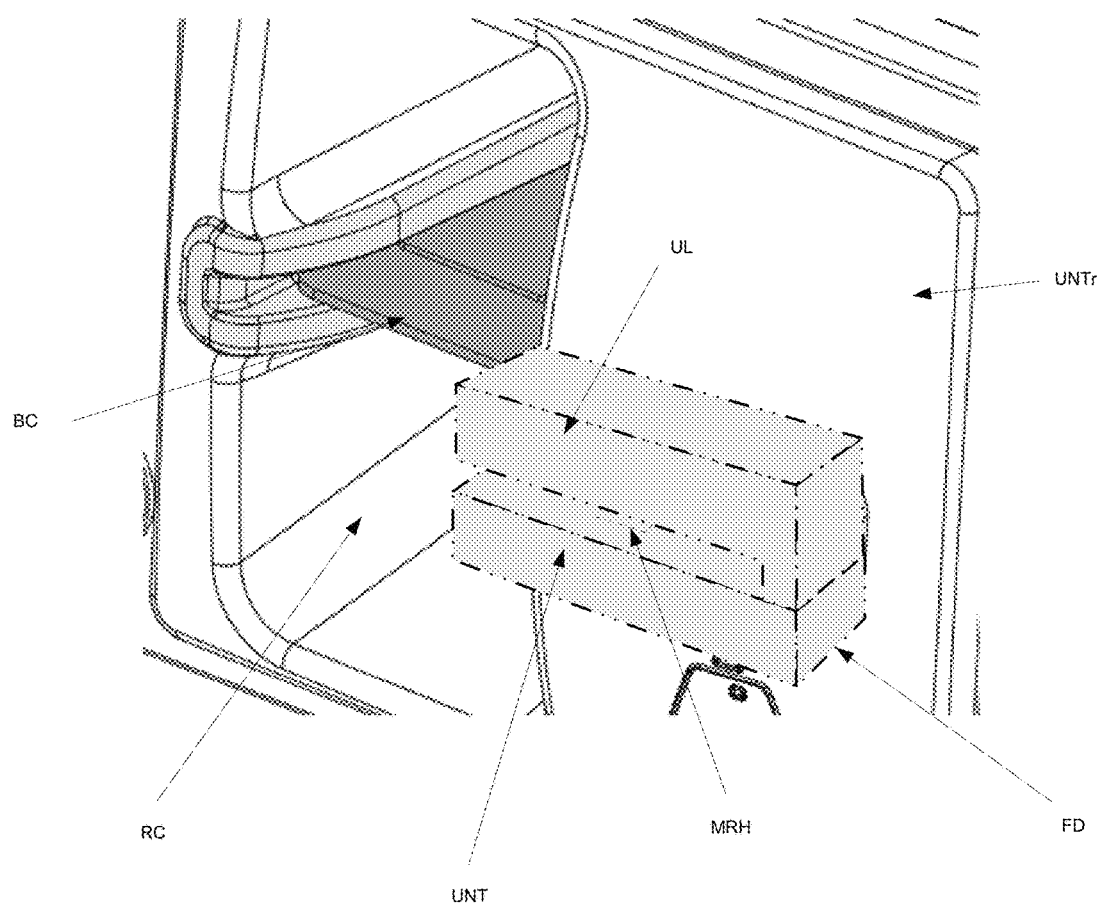
FIG. 2 is a diagrammatical view of a reader unit of prior art to which a fraudulent device is added.

In relation with FIG. 2, an example of a fraudulent device placed on the front face of a Reader unit such as shown in FIG. 1 is shown. The fraudulent device (DF) is placed in such a way that the bank card (CB) comes into contact with a magnetic reader head (TLM) camouflaged in a unit (BLC) which is fastened to the lower lip (LI) and to the upper lip (LS) of the insertion slot (FI). In certain cases, the fraudulent device has the form of a complete façade which is added to and with is superimposed perfectly onto the façade of the Reader unit (BLe). The unit (BLC) comprises a slot for the introduction of the card, this slot is used to conceal the fraudulent head; and the upper face of this slot is used as an abutment to thrust the card onto the fraudulent head. The card has to be in contact with the head in order for it to read the magnetic strip.

Figure 3:
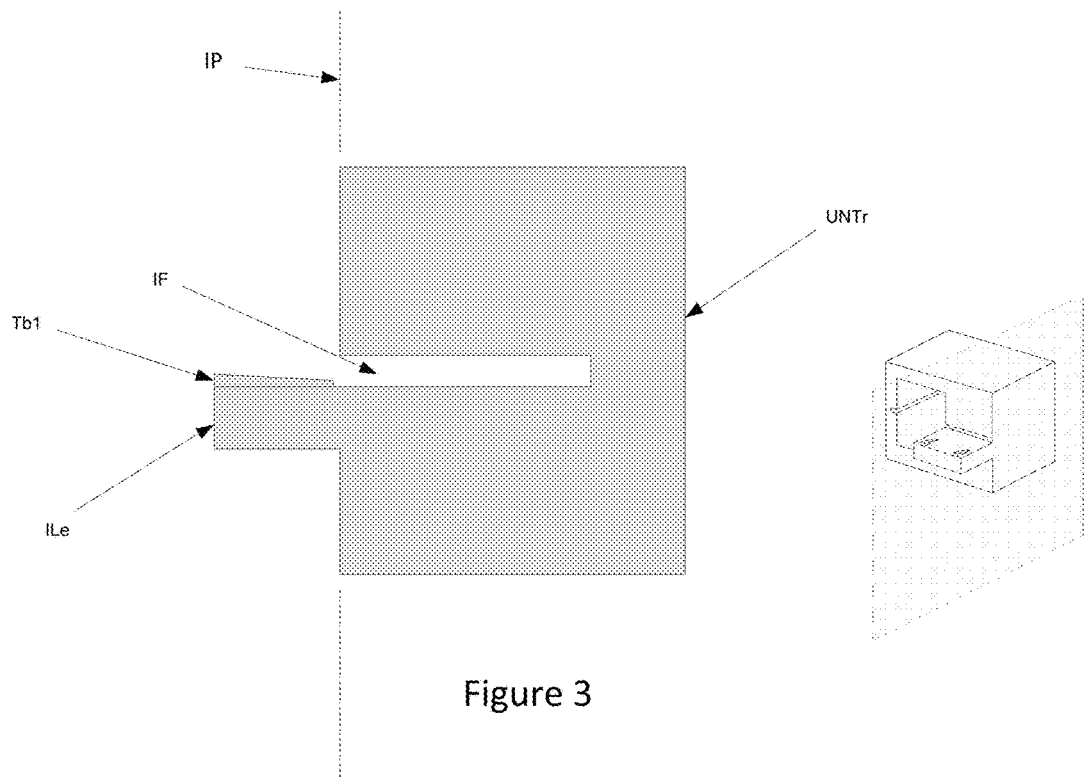
FIGS. 3 and 4 show an embodiment of a reader unit according to the technique proposed.
Figure 4:
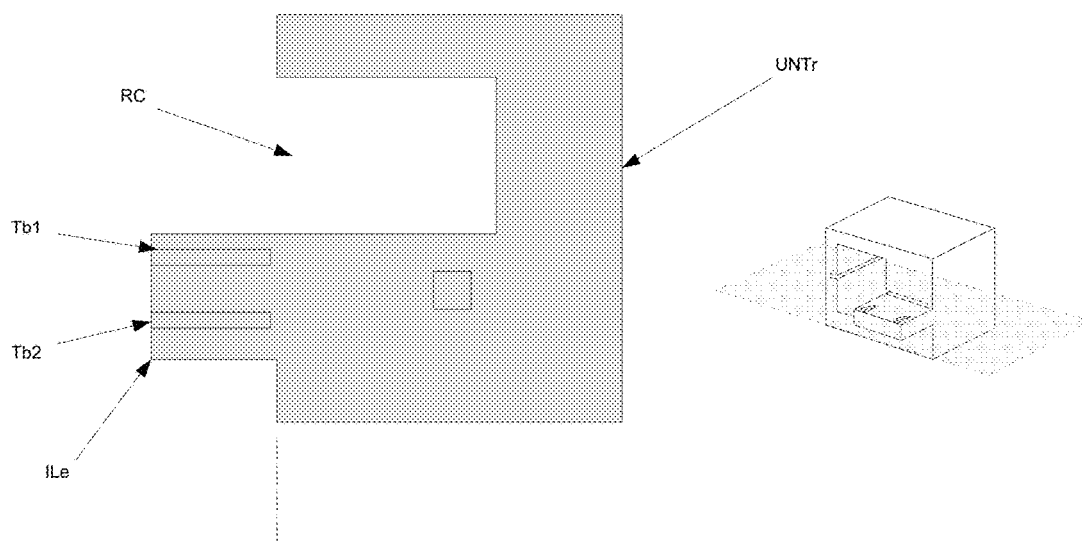

In order to suppress the possibility of the adding of such a façade, or of such fraudulent devices, the inventors had the idea to modify the shape of the lower lip (LI) of the insertion slot (FI). More particularly, as described in relation with FIGS. 3 and 4. The FIG. 3 is a block diagram of a longitudinal cross-section of the reader unit (BLe). FIG. 4 is a block diagram of a transverse cross-section of the reader unit (BLe). According to the technique proposed, the lower lip (LI) is extended longitudinally in order to comprise a protuberance, as such forming an extended lower lip (LIe). The lip is said to be extended as it extends beyond an insertion plane (PfI), which corresponds to the plane formed by the front face of the reader unit (BLe). It is indeed via this technique of extending beyond a fictive plane formed by the front face of the reader unit which is the heart of the technique proposed. Indeed by creating an overhang beyond this fictive plane, a rupture of the volume of the reader unit is created. This rupture makes it possible to make it more difficult to add an additional fraudulent piece of hardware, as the front surface of the reader unit is no longer flat. In a complementary manner, this modification in the volume of the front face of the reader unit can be carried out at other locations than that of the insertion slot of the bank card.

In a first embodiment, the thickness of the extended lower lip (LIe) is substantially equal to the thickness of the lower lip (LI). The shape of the transverse cup of the protuberance of the extended lower lip (LIe) is a quadrilateral (FIG. 4). This quadrilateral can for example be a rectangle, a trapezium, etc. The exact shape of the extended lower lip (LIe) is according on the one hand to the construction material used and on the other hand to the way in which this lip is constructed. The extended lower lip (LIe) comprises a front face (the visible face that comes into contact with the memory card) and a rear face (a non-visible face, opposite the front face).

In addition to the adding of this protuberance, the inventors had the idea to provide the front face with two tabs (Lg1, Lg2). These two tabs make it possible to create an empty space between the bank card and the surface of the front face of the extended lower lip (LIe). This space ensures that it is not possible to place a fraudulent magnetic head within the extended lower lip (LIe) itself. Indeed, in order to allow for the reading of a magnetic strip of a bank card, it is necessary for this magnetic strip to be in contact with the magnetic reader head of the card. With the tabs (Lg1, Lg2), the empty space created ensure that even if a fraudulent magnetic head were to be inserted into the extended lower lip (LIe), this fraudulent magnetic head will not be able to come into with the magnetic strip of the bank card inserted. In order to come into contact with the magnetic strip of the card, the fraudulent magnetic head would have to be visible (i.e. exit, vi an orifice of the extended lower lip (LIe), which would make the fraud visible immediately.

In addition, the front surface of these tabs (which come into contact with the bank card), is not parallel to the surface of the front face. On the contrary, the front surface of the tabs form a predetermined angle (alpha) with the flat surface of the front face. This angle makes it possible to guide the card in a predetermined manner. Moreover, the tabs are spaced between them by a distance that is substantially equal to the width of the magnetic strip of the bank card.

With an extended lower lip and the two inclined tabs, an inclination of the insertion plane of the bank card is created in the reader unit. A fraudulent device then becomes difficult to carry out as the slot of such a fraudulent device can no longer by simply in the extension of the slot of the reader; this slot must be offset and have a given inclination. Without the inclination, either the card will abut against the reader, or the magnetic reading will not be possible. The two tabs are therefore used to create the inclination of the card at the front of the reader unit without hindering the operation of the head in the reader unit itself.

Figure 5:
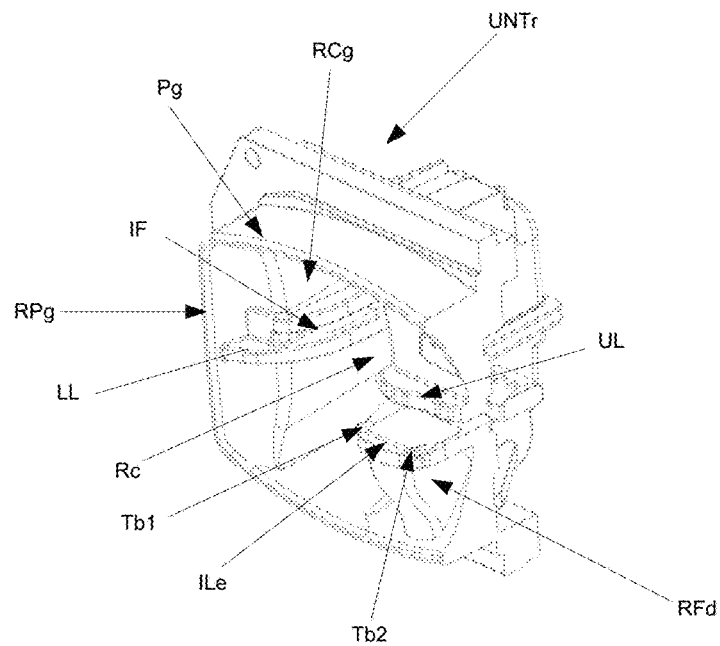
FIGS. 5, 6 and 7 show a second embodiment of a reader unit according to the technique proposed.
Figure 6:
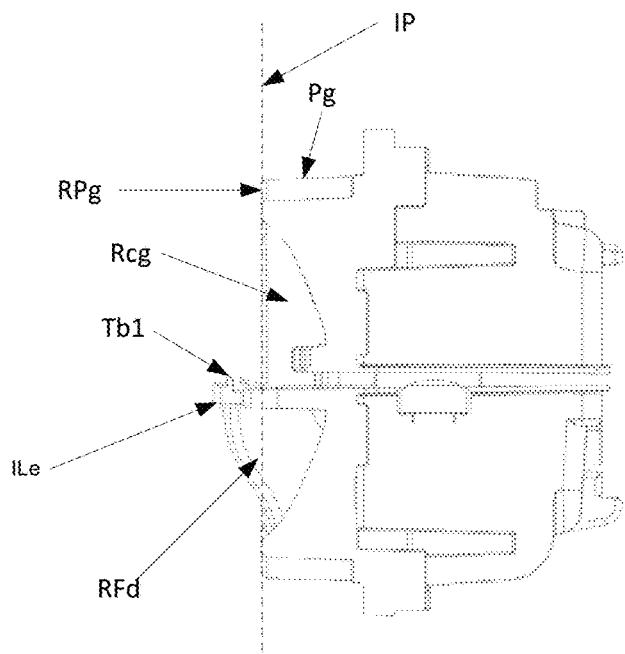
Figure 7:
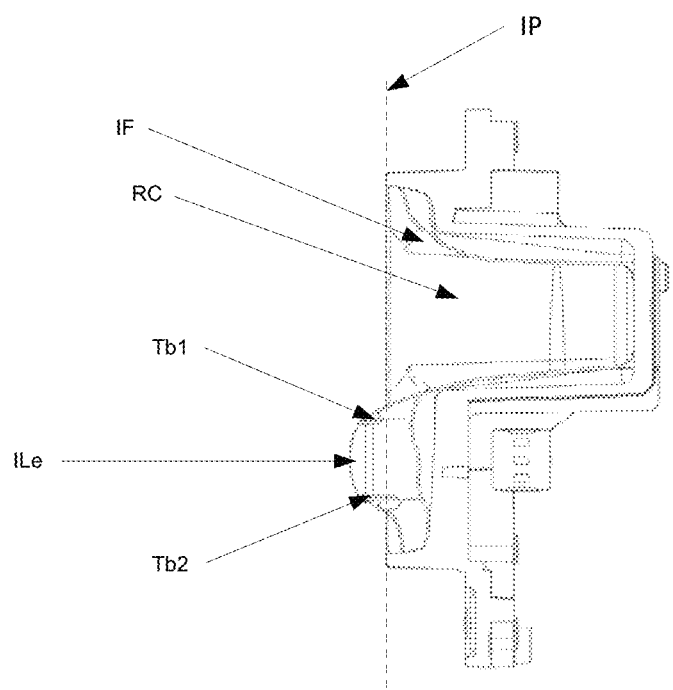

In another embodiment of the technique proposed, exposed in FIGS. 5, 6 and 7, the lower lip is extended without however this extended lip comprising a flat rear face. On the contrary the rear face is domed and is integrated into the recess of the Reader unit. This domed rear face (FPb), of a general cylindrical shape, makes it possible to prevent a degradation of the extended lower lip. Indeed, this rear face is moulded from material that resists attacks and degradations (for example metal). It is therefore not possible to make a recess in this rear face without the degradation being immediately visible. Moreover, as shown in FIGS. 5 to 7, the front face of the reader unit is not uniform: it comprises a volume structure that is different from the front face of a "conventional" reader unit, such as shown in FIG. 1. In addition to the extended lower lip (Lie), on the right side of the reader unit, the lower lip of the left side (LIg) is also slightly prominent in relation to the left upper lip. Moreover, the recess is also generalised. In addition to the recess required for the passing of the thumb and of the index finger in order to introduce the card, a "general" recess (Evg) is arranged by adding a so-called "guard" profile (Pg): this profile forms a guard (a barrier) around the insertion zone of the bank card. This guard profile makes it possible to define a general recess of the insertion zone of the bank card and as such secure the latter. It is therefore no longer possible to attempt to thrust a fraudulent factice façade onto the original façade of the reader unit. Moreover, the ring guard profile (APg) makes it possible to define an insertion plane (PfI) which is somewhat offset in relation to the initial insertion plane which should be located on the fastening plane of the reader unit (BLe) (the fastening plane is the plane that corresponds to the surface comprising the orifices for fastening (allowing for the installation of screws). It is therefore possible to attach the reader unit onto a metal structure then to cover this metal structure with a façade, also made of metal (in order to comply with the standards in effect) which can be combined with securing devices. Such securing devices make it possible to ensure that this original façade is not altered or replaced.

Therefore, in this embodiment, only the guard profile extends beyond the façade of the payment terminal and this guard profile materialises the insertion zone of the payment card. In this embodiment, this guard profile generally has the shape of a rectangular parallelepiped with rounded edges.

Although the present disclosure has been described with reference to one or more examples, workers skilled in the art will recognize that changes may be made in form and detail without departing from the scope of the disclosure and/or the appended claims.

The invention claimed is:

1. A memory card reader unit comprising:
 a generally rectangular parallelepiped shape; and
 a memory card insertion face, said insertion face comprising:
  an insertion recess; and
  a memory card insertion slot, said insertion slot comprising a lower lip and an upper lip, wherein said lower lip extends longitudinally and parallel to an insertion plane of a memory card in said insertion slot and forms an extended insertion lip extending beyond the upper lip and an insertion plane of the memory card insertion face and wherein said extended insertion lip comprises a surface facing and adjacent to the insertion slot and at least two tabs of predetermined height extending from the surface in a direction generally perpendicular to the surface and the insertion plane of a memory card in said insertion slot, said at last two tabs being disposed under the insertion plane of a memory card in said insertion slot, between lateral side edges of the insertion slot.

2. The memory card reader unit according to claim 1, wherein the surface of said extended insertion lip is substantially flat and parallel to the insertion plane of a memory card in said insertion slot.

3. The memory card reader unit according to claim 1, wherein said at least two tabs form a predetermined angle with the surface of the extended insertion lip, the surface being substantially flat and parallel to the insertion plane of a memory card in said insertion slot.

4. The memory card reader unit according to claim 1, wherein said at least two tabs are spaced apart by a distance substantially equal to the width of a magnetic strip of a memory card.

5. A transactional data processing terminal comprising:
 a keyboard for entering personal identification data,
 a screen for viewing transactional data,
 a transactional data processing module; and
 a memory card reader unit comprising:
  a generally rectangular parallelepiped shape; and
  a memory card insertion face, said insertion face comprising:
   an insertion recess; and
   a memory card insertion slot, said insertion slot comprising a lower lip and an upper lip, wherein said lower lip extends longitudinally and parallel to an insertion plane of a memory card in said insertion slot and forms an extended insertion lip extending beyond the upper lip and an insertion plane of the memory card insertion face, and wherein said extended insertion lip comprises a surface facing and adjacent to the insertion slot and at least two tabs of predetermined height extending from the surface in a direction generally perpendicular to the surface and the insertion plane of a memory card in the insertion slot, said at last two tabs being disposed under the insertion plane of a memory card in the insertion slot, between lateral side edges of the insertion slot.

* * * * *

UNITED STATES PATENT AND TRADEMARK OFFICE
CERTIFICATE OF CORRECTION

PATENT NO.       : 9,640,011 B2
APPLICATION NO.  : 14/640976
DATED            : May 2, 2017
INVENTOR(S)      : Eric Dubois et al.

Page 1 of 1

It is certified that error appears in the above-identified patent and that said Letters Patent is hereby corrected as shown below:

In the Claims

Column 6, Line 3, delete "last", insert --least--.

Column 6, Line 41, delete "last", insert --least--.

Signed and Sealed this
Third Day of October, 2017

Joseph Matal
*Performing the Functions and Duties of the*
*Under Secretary of Commerce for Intellectual Property and*
*Director of the United States Patent and Trademark Office*